United States Patent
Boyle et al.

(10) Patent No.: US 8,644,810 B1
(45) Date of Patent: Feb. 4, 2014

(54) METHOD AND SYSTEM FOR DYNAMIC FONT SUPPORT ON MOBILE DEVICES

(75) Inventors: Stephen S. Boyle, Lincoln, CA (US); Russell S. Greer, Los Gatos, CA (US)

(73) Assignee: Joingo, LLC, San Jose, CA (US)

( * ) Notice: Subject to any disclaimer, the term of this patent is extended or adjusted under 35 U.S.C. 154(b) by 202 days.

(21) Appl. No.: 13/279,237

(22) Filed: Oct. 21, 2011

Related U.S. Application Data

(60) Provisional application No. 61/405,725, filed on Oct. 22, 2010.

(51) Int. Cl.
*H04L 29/08* (2006.01)

(52) U.S. Cl.
USPC .................. 455/414.4; 455/414.1; 455/67.11; 455/466; 455/418; 345/581; 345/619; 345/418; 345/632; 345/652; 705/10; 705/14.64; 705/14.66; 705/513; 705/744

(58) Field of Classification Search
USPC ................ 455/414.1–414.4, 466, 418, 67.11; 709/203, 219, 246; 345/581, 619, 418, 345/632, 652; 705/10, 14.64, 14.66, 513, 705/744
See application file for complete search history.

(56) References Cited

U.S. PATENT DOCUMENTS

| 7,242,406 | B2 * | 7/2007 | Robotham et al. ............. 345/581 |
| 7,974,988 | B2 * | 7/2011 | Nandiwada et al. .......... 707/791 |
| 2004/0171380 | A1 | 9/2004 | Puranik et al. |
| 2006/0073788 | A1 | 4/2006 | Halkka et al. |
| 2007/0073808 | A1 | 3/2007 | Berrey et al. |
| 2007/0088801 | A1 | 4/2007 | Levkovitz et al. |
| 2008/0059631 | A1 | 3/2008 | Bergstrom et al. |
| 2008/0287095 | A1 | 11/2008 | Pousti |
| 2009/0024457 | A1 | 1/2009 | Foroutan |
| 2009/0088219 | A1 | 4/2009 | Bayne |
| 2009/0138337 | A1 | 5/2009 | Moukas et al. |
| 2009/0164310 | A1 | 6/2009 | Grossman |
| 2009/0203359 | A1 | 8/2009 | Makhoul et al. |
| 2009/0204496 | A1 | 8/2009 | Otto et al. |
| 2009/0327488 | A1 | 12/2009 | Sampat et al. |
| 2010/0004045 | A1 | 1/2010 | Roemer |
| 2010/0022227 | A1 * | 1/2010 | Aaltonen et al. ........... 455/414.1 |
| 2010/0121709 | A1 | 5/2010 | Berezin et al. |
| 2011/0054977 | A1 | 3/2011 | Jaffer |
| 2011/0191152 | A1 | 8/2011 | Schwartz |

* cited by examiner

*Primary Examiner* — Kiet Doan
*Assistant Examiner* — Michael T Vu
(74) *Attorney, Agent, or Firm* — Clause Eight IPS; Michael Catania

(57) ABSTRACT

The method and system for dynamic font support on a mobile communication device is disclosed herein. The present invention determines if a mobile communication device such as a mobile phone can properly render a digital communication from an enterprise using the native language of the mobile communication device. If not, the invention will render the digital communication at a server and transmit a raster equivalent to the mobile communication device.

19 Claims, 5 Drawing Sheets

METHOD AND SYSTEM FOR DYNAMIC FONT SUPPORT ON MOBILE DEVICES

CROSS REFERENCES TO RELATED APPLICATIONS

The Present Application claims priority to U.S. Provisional Patent Application No. 61/405,725, filed on Oct. 22, 2010, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to wireless communications. More specifically, the present invention relates to a method and system for 2. Description of the Related Art The use of mobile phones, handsets and other wireless devices is becoming a primary means for individuals to stay connected in their personal and professional lives. Mobile handsets and other wireless devices are being targeted by businesses to aid in their marketing efforts and to deliver specific textual content directly to prospective customers. The challenge in any mobile marketing campaign is that there is a wide variety of styles of phones available to the public. Most mobile phones have limited font support and in some cases support only three sizes in one font style. As a result, it is almost impossible to produce the intended end-user experience on these devices.

General definitions for terms utilized in the pertinent art are set forth below.

GSM, Global System for Mobile Communications is a second generation digital cellular network.

Code Division Multiple Access ("CDMA") is a spread spectrum communication system used in second generation and third generation cellular networks, and is described in U.S. Pat. No. 4,901,307.

Long Term Evolution ("LTE") is a next generation communication network.

Cascading style sheets ("CSS") instruct a browser how to display the contents of a document.

Interactive voice response ("IVR") is a telephone technology in which a user uses a phone to interact with a database to acquire information.

Short Message Service ("SMS") is text messaging communication using a mobile phone or other device to send messages up to 160 characters in length.

Multimedia messaging service ("MMS") communication is a communication transmitted to and from a mobile phone that includes a multimedia content such as a digital photograph (JPEG), videos, and the like.

A SMS Gateway is used to send text messages with or without a mobile phone, and is used by aggregators to forward text messages to mobile phones.

BLUETOOTH technology is a standard short range radio link that operates in the unlicensed 2.4 gigaHertz band.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Telephone Consumer Protection Act ("TCPA") of 1991 restricts the use of SMS text messages received by mobile phones, and SMS messages sent without a consumer's consent can violate the TCPA.

APP is a software application for a mobile phone such as a smart phone.

Hypertext Transfer Protocol ("HTTP") is a set of conventions for controlling the transfer of information via the Internet from a web server computer to a client computer, and also from a client computer to a web server.

HyperText Markup Language (HTML) is a method of mixing text and other content with layout and appearance commands in a file, so that a browser can generate a display from the file.

Internet is the worldwide, decentralized totality of server computers and data-transmission paths which can supply information to a connected and browser-equipped client computer, and can receive and forward information entered from the client computer.

JavaScript is an object-based programming language. JavaScript is an interpreted language, not a compiled language. JavaScript is generally designed for writing software routines that operate within a client computer on the Internet. Generally, the software routines are downloaded to the client computer at the beginning of the interactive session, if they are not already cached on the client computer.

FTP or File Transfer Protocol is a protocol for moving files over the Internet from one computer to another.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

Structural layer of a web page is the marked up document and foundation on which other layers may be applied.

Transfer Control Protocol/Internet Protocol ("TCP/IP") is a protocol for moving files over the Internet.

A SMS aggregator is an entity that provides connectivity with a mobile phone carrier by offering a SMS gateway to send and receive messages and other digital content.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

Direct Inward Dialing ("DID") involves a carrier providing one or more trunk lines to a customer for connection to the customer's private branch exchange ("PBX") and a range of telephone lines are allocated to this line.

Rendering is process of generating an image on a display screen of a computer device from marked up content (HTML, XML) and formatting information (CSS, XSL).

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

XHTML (Extensible Hypertext Markup Language) is a language for describing the content of hypertext documents intended to be viewed or read in a browser.

XML (Extensible Markup Language) is a W3C standard for text document markup, and it is not a language but a set of rules for creating other markup languages.

CRM is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

There is a need for a means for allowing marketing content to be displayed in its intended form on most if not all mobile phones.

BRIEF SUMMARY OF THE INVENTION

The present invention provides a solution to the problem of displaying content correctly on mobile phone. The present invention allows for a mobile communication device to make a textual content request to a server to determine if a textual content of a digital communication such as a coupon is supported by the mobile communication device in order to allow the coupon to be displayed as intended by an enterprise.

When a system of the present invention is engaged, the identity, in the form of the make and model, of the mobile communication device is evaluated by a device attributes database to determine if the mobile communication device can render the textual content of the digital communication with the native attributes of the mobile communication device. If the mobile communication device's native attributes can render the textual content, the textual content is sent from a content server. However, if the mobile communication device's native attributes cannot render the textual content, the system sends the textual content to a rendering engine, which converts the textual content into a raster equivalent, therefore maintaining the designer's intended typeface, size an style on the end-user mobile communication device. The raster image is then transmitted to the mobile communication device.

Thus, the present invention ensures an enterprise that regardless of the end user's mobile communication device, the requested textual content always looks perfect, or the way the digital communication was intended to appear, without any warping or disfiguration.

An enterprise uses the present invention to ensure that textual content output to a data capable communication device appears as intended on a display screen of data capable communication device.

One aspect of the present invention is a method for dynamic font support on a data capable communication device. The method includes requesting a digital communication for a data capable communication device from a content server. The digital communication comprises a textual content with an intended typeface, size and style. The method also includes transmitting make and model attributes of the data capable communication device to a device attributes database. The method also includes evaluating the make and model attributes if the data capable communication device with the textual content of the digital communication to generate an attributes evaluation. The method also includes transmitting the attributes evaluation to the content server. The method also includes determining a format for the textual content of the digital communication for transmission to the data capable communication device. The method also includes transmitting the digital communication to data capable communication device in a format compatible with the attributes of the data capable communication device.

Preferably, determining a format for the textual content of the digital communication of the method includes determining that textual content cannot be rendered utilizing the make and model attributes of the data capable communication device and the method further comprising sending the textual content of the digital communication to a rendering engine, and converting textual content into a raster equivalent of the textual content of the digital communication which maintains the intended typeface, size and style of the textual content of the digital communication, and the format compatible with the attributes of the data capable communication device is the raster equivalent of the textual content of the digital communication. Alternatively, determining a format for the textual content of the digital communication of the method includes determining that the textual content can be rendered correctly with the make and model attributes of the data capable communication device.

The method optionally includes sending the raster equivalent of the textual content of the digital communication to the content server prior to transmitting the to the raster equivalent of the textual content of the digital communication to the data capable communication device.

Another aspect of the present invention is a system for dynamic font support on a data capable communication device. The system preferably includes a content server, a rendering engine, a device attributes database, a communications network and a data capable communication device. The data capable communication device comprises a plurality of make and model attributes. The content server is configured to receive a request over the communications network for a digital communication from a data capable communication device. The digital communication comprises a textual content with an intended typeface, size and style. The content server is also configured to receive the plurality of make and model attributes of the data capable communication device. The content server is also configured to transmit the plurality of make and model attributes of the data capable communication device. The content server is also configured to transmit the digital communication to data capable communication device in a format compatible with the plurality of make and model attributes of the data capable communication device. The rendering engine is configured to convert the textual content of the digital communication into a raster equivalent of the textual content of the digital communication which maintains the intended typeface, size and style of the textual content of the digital communication. The device attributes database is configured to determine if the textual content of the digital communication can be rendered correctly with the plurality of make and model attributes of the data capable communication device.

The system preferably also comprises an enterprise server for transmitting the digital communication to the content server. The system also preferably comprises a content database comprising of a plurality of digital communications. The content database is in communication with the content server.

Yet another aspect of the present invention is a method for structural content support on a data capable communication device. The method includes requesting a digital communication for a data capable communication device from a content server. The digital communication comprises a structural content with at least one of an intended typeface, size and style. The method also includes transmitting make and model attributes of the data capable communication device to a device attributes database. The method also includes evaluating the make and model attributes if the data capable communication device with the structural content of the digital communication to generate an attributes evaluation. The method also includes transmitting the attributes evaluation to the content server. The method also includes determining a format for the structural content of the digital communication for transmission to the data capable communication device. The method also includes transmitting the digital communication to data capable communication device in a format compatible with the attributes of the data capable communication device. The digital communication is a MMS communication, an e-mail communication, a coupon from an enterprise, or a mobile marketing campaign.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
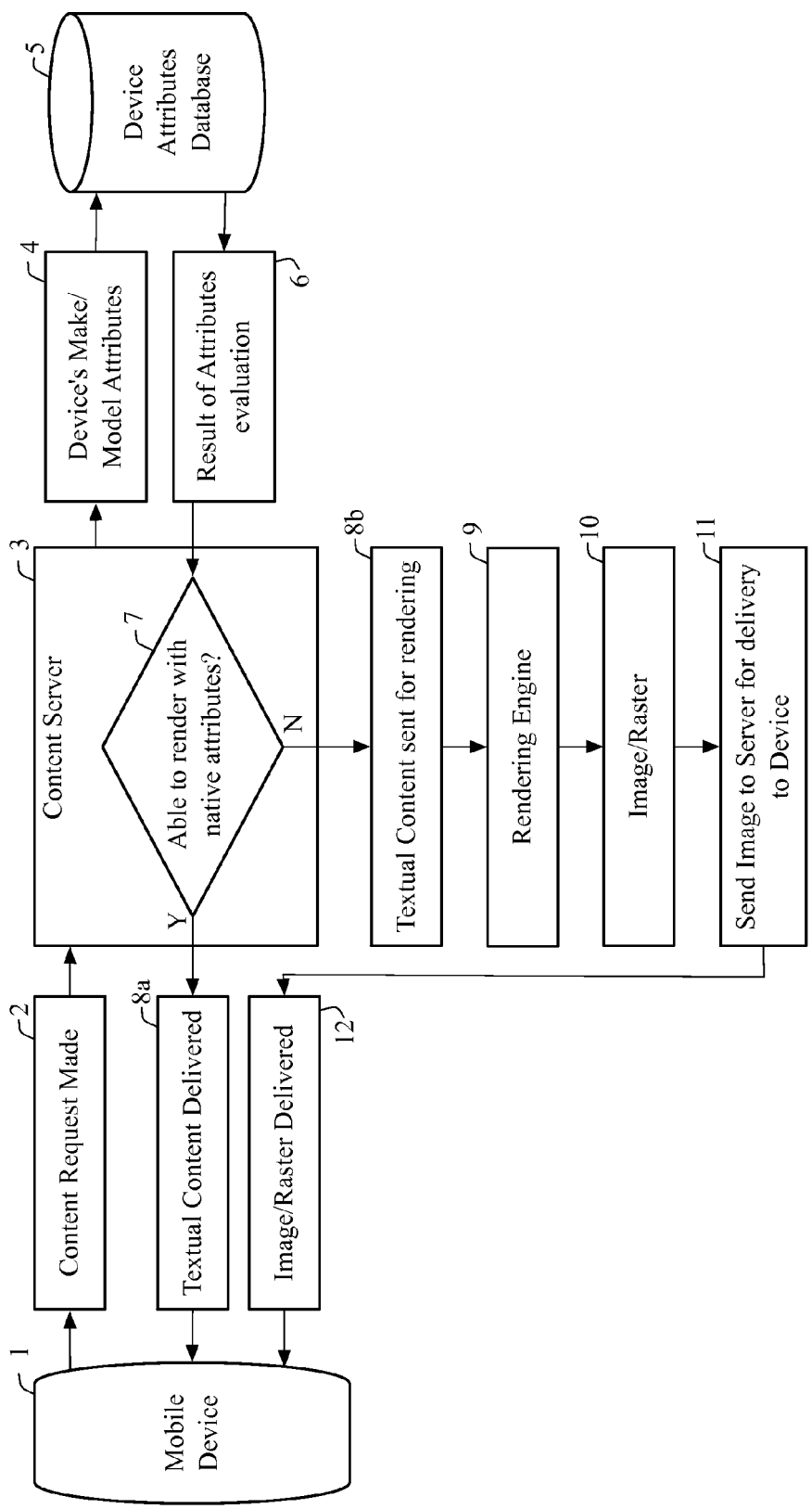
FIG. 1 is a block diagram for dynamic font support on a mobile communication device.

As shown in FIG. 1, a data capable communication device 1 requests content 2 over a network from a content server 3. When the request is made, the make and model attributes 4 of the data capable communication device 1 are sent to a device attributes database 5. The result of the attributes evaluation 6 is sent to content server 3. The content server 3 determines if the device can render the textual content using the attributes of the native language of the data capable communication device 1. If attributes of the native language of the data capable communication device 1 can render the textual content of the digital communication, then the textual content is delivered 8a to the data capable communication device 1. If attributes of the native language of the data capable communication device 1 cannot render the textual content of the digital communication, then the textual content is delivered 8b to a rendering engine 9 to translate the textual content into a graphical raster image 10 scaled to fit the display characteristics of the data capable communication device 1. The graphical raster image 10 is sent to the content server 3 for delivery 12 to the data capable communication device 1.

Figure 2:
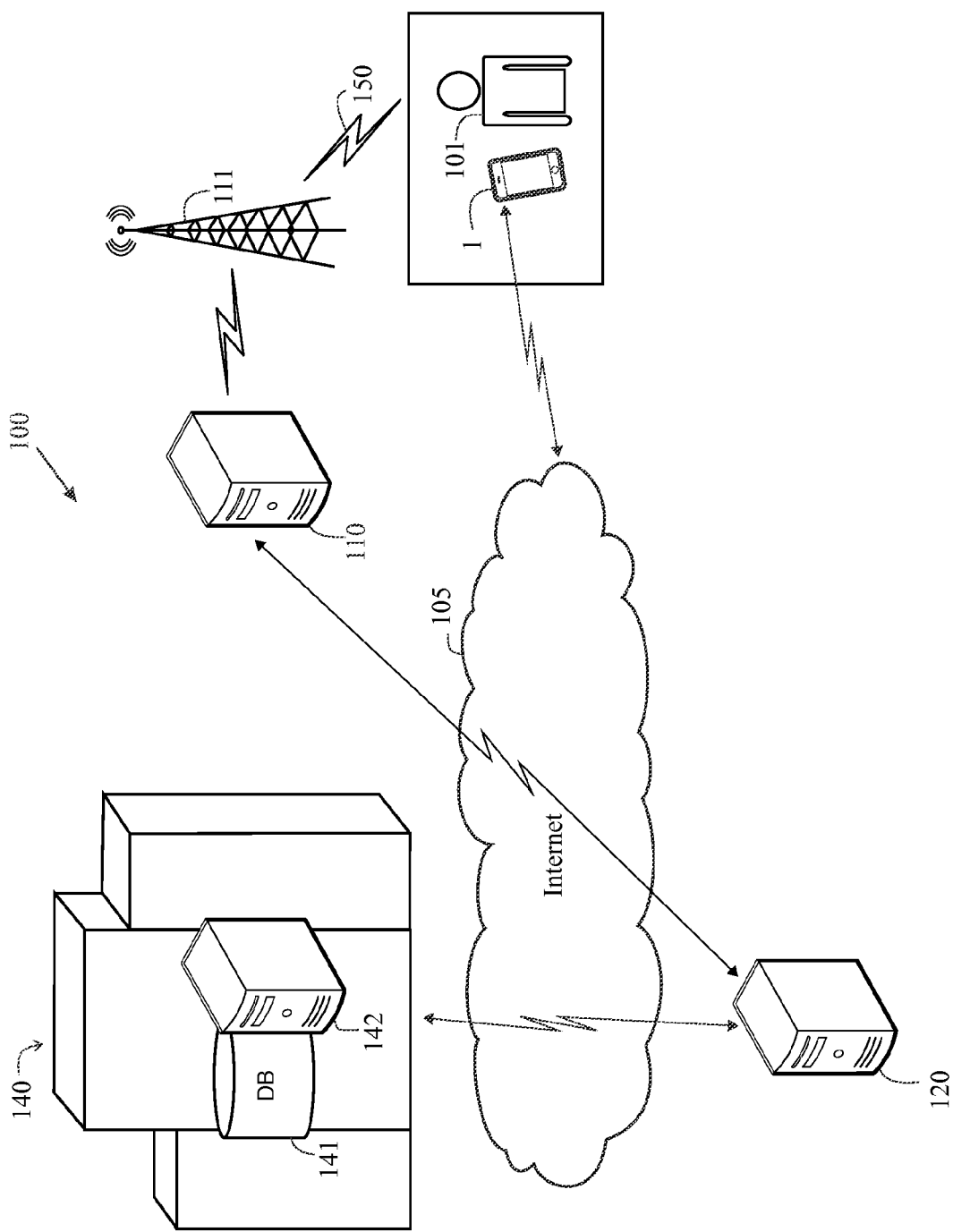
FIG. 2 is a block diagram of a system for dynamic font support on a mobile communication device.

FIG. 2 illustrates a system 100 for dynamic font support on a mobile communication device. The system 100 preferably includes a mobile communication service provider 110 with antennas 111 for transmissions over a mobile communication network 150, and a content site 120 which preferably communicates with the mobile communication service provider 110 over the Internet 105. The system 100 most preferably also includes an enterprise site 140, also communicating over the Internet 105. The enterprise site 140 preferably includes a database 141, a server 142 and a website 143. The enterprise site 140 preferably communicates with the content site 120 over the Internet 105 for a mobile marketing campaign and other digital communications to transmit to end-users of the services or products of the enterprise, or members of a rewards club of the enterprise. The content site 120 preferably communicates with the mobile communication service provider 110 over the Internet 105 to transmit digital communications to the end user 101. The end user 101 can use the data capable communication device 1 to access the Internet 105 using WiFi or the like, in addition to using the mobile communication network 150.

The enterprise can be any type of organization that desires to conduct a mobile marketing campaign or similar mobile marketing to end users. The enterprise can be a business like Exxon, Apple, Nordstrom or the like. The enterprise can be a non-profit or charity, like the American Red Cross. The enterprise can be a government agency like FEMA. The enterprise can be a political party. The enterprise can be an organization like the American Medical Association. Those skilled in the pertinent art will recognize other types of enterprises that can use the present invention.

The data capable communication device 1 utilized with the present invention can include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc. The data capable communication device 1 preferably comprises a user interface, a touchscreen, a camera, a microphone, a battery, a speaker, a power management component, a memory, a GPS receiver, a RF transceiver, an accelerometer, an applications processor and a video/image processor. Those skilled in the pertinent art will recognize that other components may be present in a data capable communication device without departing from the scope and spirit on the present invention.

Each of the interface descriptions preferably discloses use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server such as the content server 3 is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP") or other similar protocols. The transmission protocol ranges from SIP to MGCP to FTP and beyond. The protocol at the content server 3 is preferably HTTP.

The content server 3 preferably comprises a CPU, a main memory, a system bus, a disk controller, multiple communication ports, a graphic controller, an input, an auxiliary storage and an output. Those skilled in the pertinent art will recognize that other components may be present in a server without departing from the scope and spirit on the present invention.

The mobile communication service provider (aka phone carrier) of the end user such as VERIZON, AT&T, SPRINT, T-MOBILE, and the like mobile communication service providers, provide the communication network for communication to the data capable communication device 1.

Figure 3:
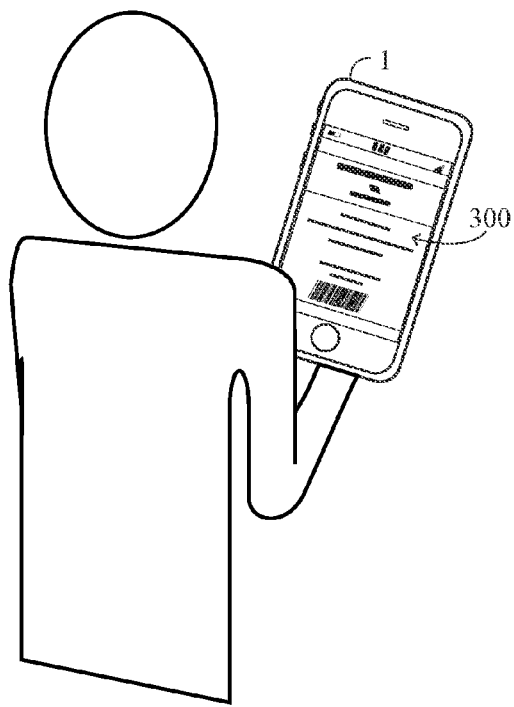
FIG. 3 is an illustration of an end-user receiving a coupon on a data capable communication device from an enterprise.
Figure 4:
FIG. 4 is an isolated view of the screen of a data capable communication device of FIG. 3 illustrating a coupon from an enterprise.
Figure 5:
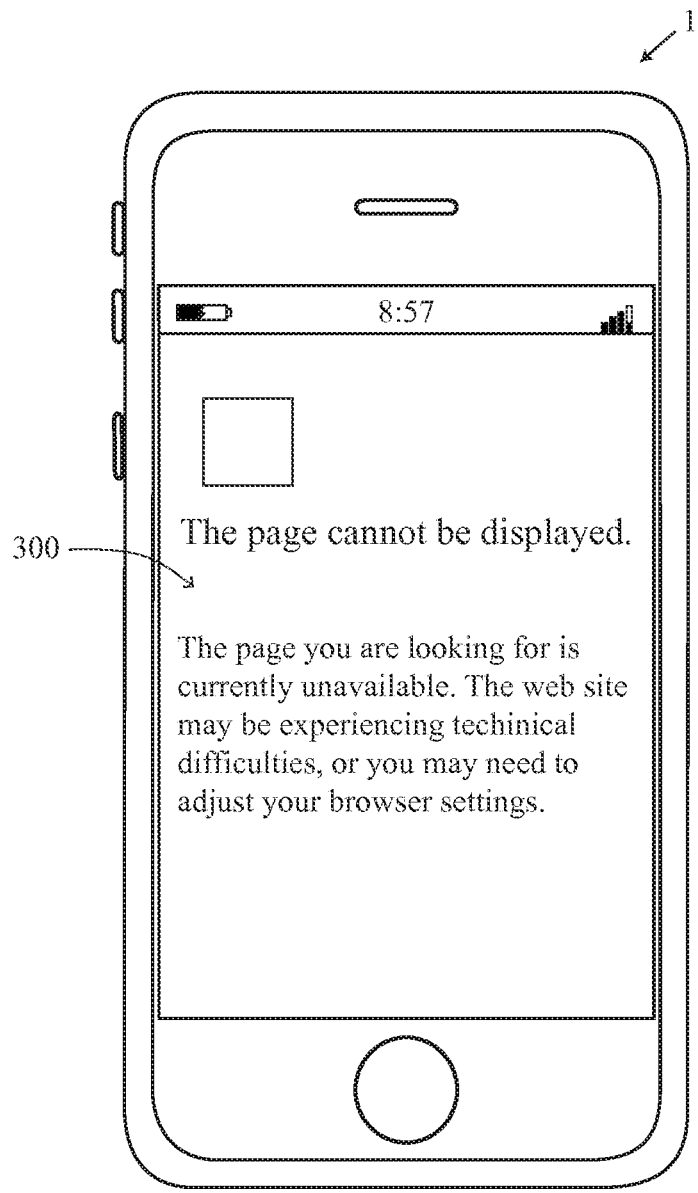
FIG. 5 is an illustration of a digital communication that cannot be rendered on a data capable communication device since the content is not supported by the native language of the data capable communication device.

As shown in FIGS. 3 and 4, an end user receives a digital communication 300 on the end user's data capable communication device 1. The digital communication 300 is a coupon from an enterprise (a casino and hotel) sent to the end user who is a member of a rewards club of the enterprise. The digital communication has been processed through the system of the present invention in order to be presented to the end user on the display screen of the end user's data capable communication device 1 in the manner intended by the enterprise. FIG. 5 illustrates the same digital communication 300 sent by the enterprise but without the use of the system of the present invention, resulting in the digital communication 300 not being presented in the manner intended by the enterprise.

Figure 6:
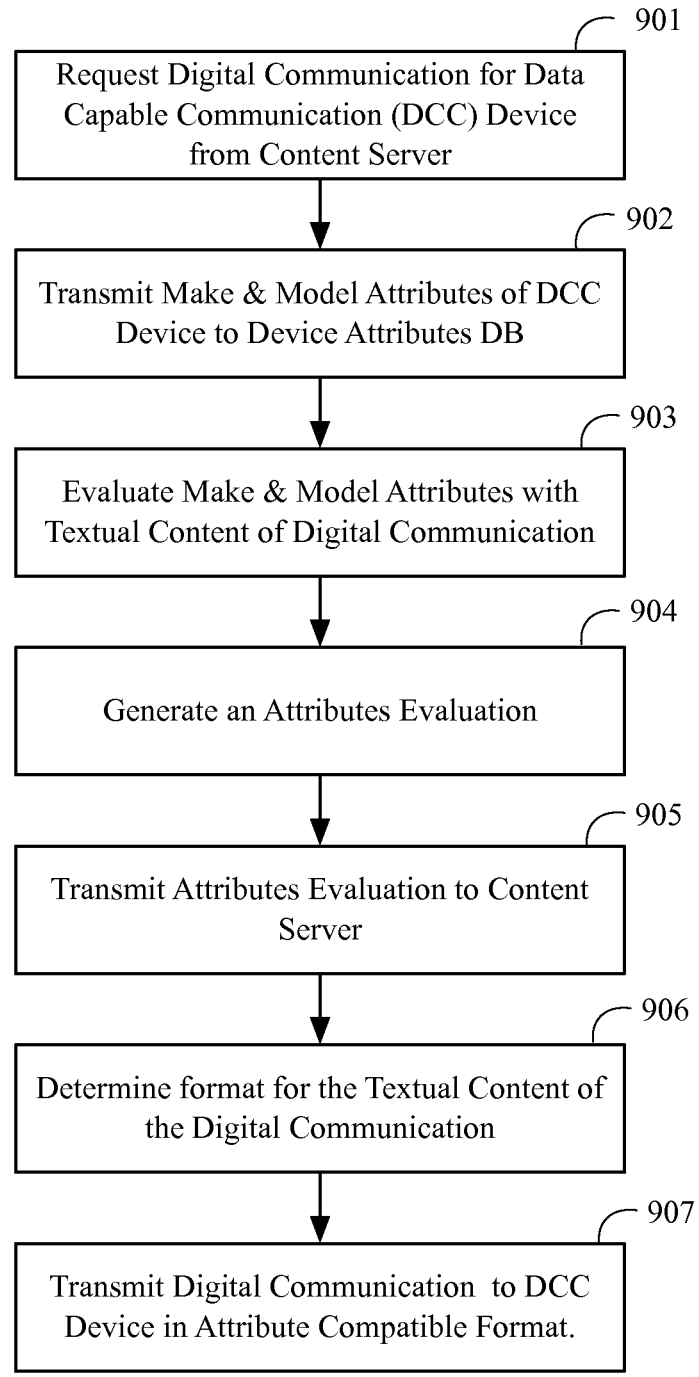
FIG. 6 is a flow chart of a preferred method for dynamic font support on a mobile communication device.

FIG. 6 is a flow chart of a preferred method 900 for dynamic font support on a mobile communication device. At block 901, a digital communication for a data capable communication device is requested from a content server. The digital communication comprises a textual content with an intended typeface, size and style. At block 902, make and model attributes of the data capable communication device are transmitted to a device attributes database. At block 903, the make and model attributes of the data capable communication device are evaluated with the textual content of the digital communication. At block 904, an attributes evaluation is generated. At block 905, the attributes evaluation is transmitted to the content server. At block 906, a format for the textual content of the digital communication is determined for transmission to the data capable communication device.

At block 907, the digital communication is transmitted to data capable communication device in a format compatible with the attributes of the data capable communication device.

The operation of the invention determines if pre-rending is necessary, which is the case for MMS and e-mail communications. For example, if an MMS communication is to be sent to the data capable communication device, all of the content needs to be delivered in a single transmission. Therefore, the graphics, layout, and the text strings of the digital communication cannot be separated. The parts of the digital communication need to be pressed into a single image for delivery to the data capable communication device. The graphics and layout are easy, however, the text is more difficult. The text has to be rendered on the server and then pressed into the image before it can be delivered to the data capable communication device. Even if the data capable communication device has the capability of performing on-device rendering, the pre-rendering must be performed for MMS and e-mail communications. Therefore, if the digital communication is a MMS or e-mail communication, the pre-rending of the digital communication must be performed on the server. The digital communication may be converted into a JPEG image for the MMS or email communication. Those skilled in the pertinent art will recognize that other image formats may be used without departing from the scope and spirit of the present invention.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for dynamic font support on a data capable communication device, the method consisting essentially of the steps of:

requesting in a request transmission a digital communication for a data capable communication device from a content server, the digital communication comprising a textual content with an intended typeface, size and style, the request transmission comprising a plurality of make and model native attributes of the data capable communication device;

transmitting the plurality of make and model native attributes of the data capable communication device from the content server to a device attributes database;

evaluating the plurality of make and model native attributes of the data capable communication device with the textual content of the digital communication at the device attributes database to generate an attributes evaluation wherein the attributes evaluation determines if the data capable communication device can render the textual content of the digital communication using the plurality of make and model native attributes of the data capable communication device;

transmitting the attributes evaluation from the device attributes database to the content server;

determining at the content server a format for the textual content of the digital communication for transmission to the data capable communication device; and transmitting the digital communication to data capable communication device in a format compatible with the plurality of make and model native attributes of the data capable communication device, the digital communication comprising the textual content with the intended typeface, size and style.

2. The method according to claim 1 wherein determining a format for the textual content of the digital communication comprises determining that the textual content can be rendered correctly with the plurality of make and model native attributes of the data capable communication device.

3. The method according to claim 1 wherein determining a format for the textual content of the digital communication comprises determining that textual content cannot be rendered utilizing the plurality of make and model native attributes of the data capable communication device and the method further comprising sending the textual content of the digital communication to a rendering engine, and converting textual content into a raster equivalent of the textual content of the digital communication which maintains the intended typeface, size and style of the textual content of the digital communication, and the format compatible with the attributes of the data capable communication device is the raster equivalent of the textual content of the digital communication.

4. The method according to claim 3 further comprising sending the raster equivalent of the textual content of the digital communication to the content server prior to transmitting the to the raster equivalent of the textual content of the digital communication to the data capable communication device.

5. The method according to claim 1 wherein determining a format for the textual content of the digital communication comprises determining that textual content cannot be rendered utilizing the plurality of make and model native of the data capable communication device and the method further comprising sending the textual content of the digital communication to a rendering engine, rendering the textual content, and pressing the textual content into an image comprising the graphics and layout of the digital communication to generate a raster equivalent of the digital communication which maintains the intended typeface, size and style of the textual content of the digital communication, and the format compatible with the attributes of the data capable communication device is the raster equivalent of the textual content of the digital communication, and wherein the digital communication is a MMS communication.

6. The method according to claim 1 wherein the data capable communication device is a mobile phone.

7. The method according to claim 1 wherein the digital communication is for a mobile marketing campaign.

8. The method according to claim 1 wherein the digital communication is for a coupon from an enterprise.

9. The method according to claim 1 wherein the data capable communication device is a tablet computer.

10. The method according to claim 1 wherein determining a format for the textual content of the digital communication comprises determining that textual content cannot be rendered utilizing the plurality of make and model native attributes of the data capable communication device and the method further comprising sending the textual content of the digital communication to a rendering engine, rendering the textual content, and pressing the textual content into an image comprising the graphics and layout of the digital communication to generate a raster equivalent of the digital communication which maintains the intended typeface, size and style of the textual content of the digital communication, and the format compatible with the attributes of the data capable communication device is the raster equivalent of the textual content of the digital communication, and wherein the digital communication is an e-mail communication.

11. A system for dynamic font support on a data capable communication device, the system comprising:
a data capable communication device comprising a plurality of make and model native attributes;
a communications network;
a content server configured to receive a request over the communications network for a digital communication from a data capable communication device, the digital communication comprising a textual content with an intended typeface, size and style, the content server also configured to receive the plurality of make and model native attributes of the data capable communication device, the content server also configured to transmit the plurality of make and model native attributes of the data capable communication device, the content server also configured to transmit the digital communication to data capable communication device in a format compatible with the plurality of make and model native attributes of the data capable communication device, the digital communication comprising the textual content with the intended typeface, size and style;
a rendering engine configured to convert the textual content of the digital communication to maintain the intended typeface, size and style of the textual content of the digital communication; and
a device attributes database configured to determine if the textual content of the digital communication can be rendered correctly with the plurality of make and model native attributes of the data capable communication device.

12. The system according to claim 11 further comprising an enterprise server for transmitting the digital communication to the content server.

13. The system according to claim 11 further comprising a content database comprising of a plurality of digital communications, the content database in communication with the content server.

14. The system according to claim 11 wherein the digital communication is a MMS communication.

15. The system according to claim 11 wherein the rendering engine is configured to render the textual content and press the textual content into an image comprising the graphics and layout of the digital communication to generate a raster equivalent of the digital communication which maintains the intended typeface, size and style of the textual content of the digital communication.

16. The system according to claim 11 wherein the digital communication is for a mobile marketing campaign.

17. The system according to claim 11 wherein the data capable communication device is a tablet computer or a mobile phone.

18. The system according to claim 11 wherein the digital communication is an e-mail communication.

19. The system according to claim 11 wherein the digital communication is a coupon from an enterprise.

* * * * *